W. W. BURNS.
PISTON AND PISTON RING.
APPLICATION FILED AUG. 5, 1920.

1,419,715.

Patented June 13, 1922.

INVENTOR
Walter W. Burns

UNITED STATES PATENT OFFICE.

WALTER W. BURNS, OF GREENPORT, NEW YORK, ASSIGNOR TO HARRY B. JOHNSTON, OF SEATTLE, WASHINGTON.

PISTON AND PISTON RING.

1,419,715.  Specification of Letters Patent. Patented June 13, 1922.

Application filed August 5, 1920. Serial No. 401,357.

*To all whom it may concern:*

Be it known that I, WALTER W. BURNS, a citizen of the United States, residing at Greenport, in the county of Suffolk and State of New York, have invented certain new and useful Improvements in Pistons and Piston Rings, of which the following is a specification.

My invention relates to pistons and piston rings used in fluid engines in which a piston reciprocates within a cylinder and wherein it is desired to obtain a tight seal between the piston and cylinder thereby preventing the passage of the fluid under pressure.

An object of my invention is the provision of a piston and ring construction wherein the ring is constructed of a plurality of sections and wherein the fluid under pressure at the end of the cylinder will cause the split ring to be forced out against the cylindrical wall of the cylinder and wherein the ring is so constructed that it will not leak at the split.

Another object of my invention is the provision of a very simple double seal ring composed of a plurality of ring sections having their contacting surfaces constructed in planes.

Referring to the drawing where preferred embodiments of my invention are set forth:

Figure 1:
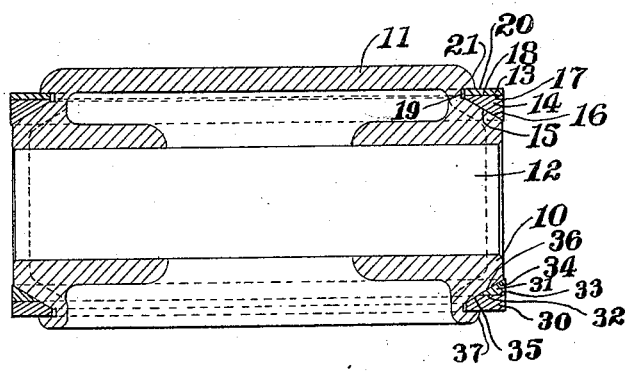
Figure 1 is a cross section of a piston showing two preferred embodiments installed in the grooves therein.

In the drawing, 10 designates the cylindrical shell of the piston, 11 the head thereof and 12 the wrist connection. 13 and 14 designate the ring sections. The groove is provided with an inclined wall 15 which inclines outwardly and away from the end of the cylinder. The ring section 14 is provided with an inclined surface 16 which cooperates with the inclined wall 15 of the groove. The surface 17, opposite the surface 16, is in a plane and contacts with a similar surface 18 on the ring section 13. The surfaces 17 and 18 extend from the outer cylindrical surface of the ring to the inner cylindrical surface adjacent the carbon space 19. In the preferred form, the surface 20 of the ring section 13 is as illustrated in a plane. The piston is cut away as at 21 to permit the gas to more readily reach the ring.

In the form of ring shown in the lower groove in Figure 1, the ring sections 30 and 31 are provided with surfaces 32 and 33, respectively, which lie in a plane. These surfaces extend from the outer cylindrical surface of the ring to the inside on the conical or inclined surface thereof thus furnishing a conical or inclined surface on each of the ring sections. These conical or inclined surfaces 34 and 35, together form the conical or inclined surface of the ring which seats upon the conical or inclined wall 36 of the groove. The piston is cut away at 37 in a manner similar to the cut away portion 21.

Figure 2:
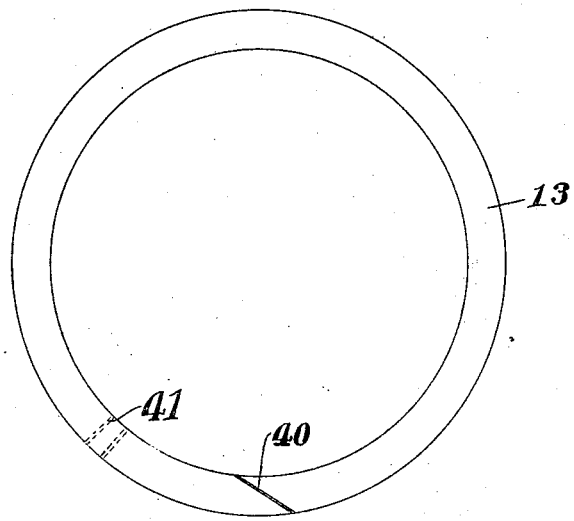
Figure 2 is a plan view of the ring shown in the upper groove in Figure 1, showing one method of making the splits in the ring sections.
Figure 3:
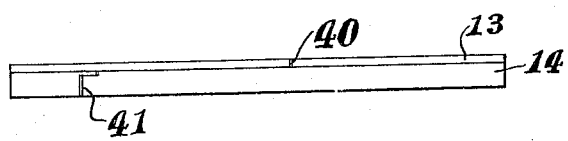
Figure 3 is a side view of the ring shown in the upper groove in Figure 1 showing another view of the splits in the sections.

The rings may be split as is illustrated at 40 and 41 of Figures 2 and 3. The particular form of split for each section is not a part of this invention and any suitable split may be used.

A great advantage in my ring is that while a double seal ring is provided the contacting surfaces are in a plane and are consequently more easily made.

When the fluid pressure presses on the exposed surface of either the ring section 13 or the ring section 30, the pressure is transmitted to the inclined surface and one or both of the split ring sections caused to expand and make a tight seal with the cylinder wall. The greater the fluid pressure, the greater will be the tendency for the ring to slide on the inclined wall and the tighter will be the seal.

The ring is preferably made with a greater radial than axial thickness and is preferably made with spring tension so that it will be already slightly against the wall when the fluid pressure begins to act.

While I describe cut away portions 21 and 37, this is not to be construed as a method of manufacture. The term is merely descriptive of the feature of the structure which may be provided in the piston to permit the fluid under pressure to more readily reach the ring.

While I have described my invention in detail I desire to have it understood that I do not confine myself to the exact structure shown and that modifications and changes may be made without departing from the spirit of my invention and within the scope of the appended claims.

Having described my invention what I claim is:

1. A piston ring having an inclined surface and comprising a plurality of ring sections, two of the sections having contacting walls lying in a plane, the ring having a greater axial thickness than radial thickness.

2. A piston ring having an inclined surface and comprising a plurality of ring sections, two of the sections having contacting walls lying in a plane and extending from the outside to the inside of the ring, the ring having a greater axial thickness than radial thickness.

3. A piston ring having an inclined surface and comprising a plurality of ring sections, each of the sections having a wall contacting with another surface and lying in a plane, and each having a cylindrical surface and an inclined surface, the inclined surfaces together forming the inclined surface of the ring as a whole, the ring having a greater axial thickness than radial thickness.

4. In combination, a piston having a groove with an inclined wall, a piston ring in the groove and having an inclined surface cooperating with the inclined wall, the ring comprising a plurality of ring sections having contacting walls lying in a plane, the ring having a greater radial thickness than axial thickness.

5. In combination, a piston having a groove with an inclined wall, a piston ring in the groove and having an inclined surface cooperating with the inclined wall, the ring comprising a plurality of ring sections, each of the sections having a wall contacting with another surface and lying in a plane, and each having a cylindrical surface and an inclined surface, the inclined surfaces together forming the inclined surface of the ring as a whole, the ring having a greater radial thickness than axial thickness.

6. In combination, a piston having a groove with an inclined wall, a piston ring in the groove and having outwardly diverging surfaces of unequal inclination relative to a plane perpendicular to the axis of the ring and comprising a plurality of ring sections, one of the ring sections being integral and having a single split, two of the ring sections having contacting surfaces substantially parallel to the ring surface having the least inclination to the axis of the ring, the ring having a greater radial thickness than axial thickness.

7. In combination, a piston having a groove with an inclined wall, a piston ring in the groove and having an inclined surface cooperating with the inclined wall, the ring comprising a plurality of ring sections having contacting walls lying in a plane, one of the ring sections being integral and having a single split, the piston having a cut away portion between the ring and the space beyond the end of the piston to permit the fluid under pressure to reach the ring.

8. In combination, a piston having a groove with an inclined wall, a piston ring in the groove and having an inclined surface cooperating with the inclined wall, the ring comprising a plurality of ring sections having contacting surfaces lying in a plane and extending from the outside to the inside of the ring the inner surfaces terminating each in an inclined surface forming a part of the inclined surface as a whole, one of the ring sections being integral and having a single split, the piston having a cut away portion between the ring and the space beyond the end of the piston to permit the fluid under pressure to reach the ring.

9. A piston ring having a surface inclined relative to a plane perpendicular to the outer cylindrical surface for contact with the cylindrical wall of a cylinder, the ring comprising a plurality of coacting split ring sections two of the sections having surfaces toward adjacent faces and lying in a plane and terminating outwardly adjacent the cylindrical surface and inwardly adjacent the inclined surface of the ring, the ring having a greater radial thickness than axial thickness.

10. A piston ring having outwardly diverging surfaces and comprising a plurality of ring sections, two of the sections having contacting walls lying in a plane, the ring having a greater radial thickness than axial thickness.

11. A piston ring having outwardly diverging surfaces and comprising a plurality of ring sections, two of the sections having contacting walls lying in a plane, each section having a cylindrical outer surface for contact with the wall of a cylinder, the ring having a greater radial thickness than axial thickness.

12. A piston ring having outwardly diverging surfaces and comprising a plurality of ring sections, two of the sections having contacting surfaces lying in a plane and extending from the outside to the inside of the ring, the inner surfaces terminating each in an inclined surface forming a part of the inclined surface of the ring as a whole, the ring having a greater radial thickness than axial thickness.

13. In combination, a piston having a groove with an inclined wall and a ring in the groove, the groove having walls for fixedly limiting the axial movement of the ring therein, the ring having outwardly diverging surfaces, one of which is in contact with the inclined wall, the ring comprising a plurality of ring sections, one of the ring sections being integral and having a single split, each of two of the sections having a surface contacting with a surface of an adjacent section and lying in a plane and having a cylindrical surface and an inclined surface, the inclined surfaces of the sections making together the inclined surface of the ring as a whole.

14. In combination, a piston having a groove with an inclined wall, and a ring in the groove, the ring having outwardly diverging surfaces, one of which is in contact with the inclined wall, the ring comprising a plurality of ring sections, two of the sections having contacting walls lying in a plane, the ring having a greater radial thickness than axial thickness.

15. In combination, a piston having a groove with an inclined wall, and a ring in the groove, the ring having outwardly diverging surfaces, one of which is in contact with the inclined wall, the ring comprising a plurality of ring sections, two of the sections having contacting walls lying in a plane and extending from the outside to the inside of the ring, the ring having a greater radial thickness than axial thickness.

16. In combination, a piston having a groove with an inclined wall, and a ring in the groove, the ring having outwardly diverging surfaces, one of which is in contact with the inclined wall, the ring comprising a plurality of ring sections, two of the sections having contacting surfaces lying in a plane and extending from the outside to the inside of the ring, the inner surfaces terminating each in an inclined surface forming a part of the inclined surface of the ring as a whole, the ring having a greater radial thickness than axial thickness.

17. In combination, a piston having a groove with an inclined wall, and a ring in the groove, the ring having outwardly diverging surfaces, one of which is in contact with the inclined wall, the ring comprising a plurality of ring sections, one of the ring sections being integral and having a single split, two of the sections having contacting walls lying in a plane, the piston having a cutaway portion between the ring and the space beyond the end of the piston to permit the fluid under pressure to reach the ring.

18. In combination, a piston having a groove with an inclined wall, and a ring in the groove, the ring having outwardly diverging surfaces, one of which is in contact with the inclined wall, the ring comprising a plurality of ring sections, one of the ring sections being integral and having a single split, two of the sections having contacting walls lying in a plane, each section having a cylindrical surface for contact with the wall of a cylinder, the piston having a cut away portion between the ring and the space beyond the end of the piston to permit the fluid under pressure to reach the ring.

19. In combination, a piston having a groove with an inclined wall, the groove having walls for fixedly limiting the axial movement of the ring therein, and a ring in the groove, the ring having outwardly diverging surfaces, one of which is in contact with the inclined wall the ring comprising a plurality of ring sections, two of the sections having contacting surfaces lying in a plane and extending from the outside to the inside of the ring, the inner surfaces terminating each in an inclined surface forming a part of the inclined surface of the ring as a whole, the piston having a cut away portion between the ring and the space beyond the end of the piston to permit the fluid under pressure to reach the ring.

20. In combination, a piston having a groove with an inclined wall, the groove having walls for fixedly limiting the axial movement of the ring therein, and a ring in the groove, the ring having outwardly diverging surfaces, one of which is in contact with the inclined wall, the ring comprising a plurality of ring sections, each of two of the sections having a surface contacting with a surface of an adjacent section and lying in a plane and having a cylindrical surface and an inclined surface, the inclined surfaces of the sections making together the inclined surface of the ring as a whole, the piston having a cut away portion between the ring and the space beyond the end of the piston to permit the fluid under pressure to reach the ring.

In testimony whereof, I affix my signature.

WALTER W. BURNS.